(12) United States Patent
Feroz et al.

(10) Patent No.: US 10,726,119 B2
(45) Date of Patent: Jul. 28, 2020

(54) MONITORING APPLICATION EXECUTION IN A CLONE OF A VIRTUAL COMPUTING INSTANCE FOR APPLICATION WHITELISTING

(71) Applicant: VMware, Inc., Palo Alto, CA (US)

(72) Inventors: Azeem Feroz, San Jose, CA (US); Binyuan Chen, Belmont, CA (US)

(73) Assignee: VMware, Inc., Palo Alto, CA (US)

( * ) Notice: Subject to any disclaimer, the term of this patent is extended or adjusted under 35 U.S.C. 154(b) by 851 days.

(21) Appl. No.: 14/564,062

(22) Filed: Dec. 8, 2014

(65) Prior Publication Data
US 2016/0162685 A1  Jun. 9, 2016

(51) Int. Cl.
*G06F 21/53* (2013.01)
*G06F 9/455* (2018.01)

(52) U.S. Cl.
CPC .......... *G06F 21/53* (2013.01); *G06F 9/45558* (2013.01); *G06F 2009/45562* (2013.01); *G06F 2009/45587* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 8,032,351 B2 * | 10/2011 | Stringham | .......... | G06F 11/0793 703/21 |
| 8,151,263 B1 * | 4/2012 | Venkitachalam | ....... | G06F 9/485 711/162 |
| 8,584,089 B2 * | 11/2013 | Kanno | ................ | G06F 11/3668 714/38.1 |
| 8,793,787 B2 * | 7/2014 | Ismael | .................. | G06F 21/566 726/1 |
| 8,966,632 B1 * | 2/2015 | Huang | .................... | G06F 21/53 713/183 |

(Continued)

FOREIGN PATENT DOCUMENTS

WO    WO2012023657 A1 *  2/2012

OTHER PUBLICATIONS

U.S. Appl. No. 14/136,661, Entitled "Fast Instantiation of Virtual Machines", filed Dec. 20, 2013.

*Primary Examiner* — Yongjia Pan
(74) *Attorney, Agent, or Firm* — Patterson + Sheridan, LLP

(57) ABSTRACT

In a virtualized computer system, gray applications that are selected to be executed in a first virtual computing instance are executed and monitored in a second virtual computing instance that is a clone of the first virtual computing instance, and classified according to their monitored behavior. This process is conducted in real-time, in response to a notification that a gray application has been selected for execution in the first virtual computing instance. The execution of the gray application in the first virtual computing instance is delayed until the first virtual computing instance receives a notification from an application admission control manager that the gray application is safe to be executed in the first virtual computing instance. Although the execution of the gray application in the first virtual computing instance is delayed, all other processes running in the first virtual computing instance continue to their execution so that a user accessing the first virtual computing instance will not experience any downtime.

18 Claims, 3 Drawing Sheets

(56) References Cited

U.S. PATENT DOCUMENTS

| | | | | |
|---|---|---|---|---|
| 9,164,790 | B2* | 10/2015 | Laor | G06F 9/45558 |
| 9,495,538 | B2* | 11/2016 | Schneider | G06F 21/52 |
| 9,519,781 | B2* | 12/2016 | Golshan | G06F 21/53 |
| 2006/0161982 | A1* | 7/2006 | Chari | G06F 21/554 |
| | | | | 726/23 |
| 2007/0271483 | A1* | 11/2007 | Kolawa | G06F 11/3664 |
| | | | | 714/38.1 |
| 2008/0133208 | A1* | 6/2008 | Stringham | G06F 11/0712 |
| | | | | 703/20 |
| 2008/0222729 | A1* | 9/2008 | Chen | H04L 63/145 |
| | | | | 726/24 |
| 2008/0244525 | A1* | 10/2008 | Khalil | G06F 11/3688 |
| | | | | 717/124 |
| 2010/0077445 | A1* | 3/2010 | Schneider | G06F 21/52 |
| | | | | 726/1 |
| 2010/0122343 | A1* | 5/2010 | Ghosh | G06F 21/55 |
| | | | | 726/23 |
| 2011/0252278 | A1* | 10/2011 | Kanno | G06F 11/3668 |
| | | | | 714/38.1 |
| 2012/0054744 | A1* | 3/2012 | Singh | G06F 21/53 |
| | | | | 718/1 |
| 2013/0132944 | A1* | 5/2013 | Davis | G06F 9/468 |
| | | | | 718/1 |
| 2013/0290958 | A1* | 10/2013 | Ansel | G06F 9/45504 |
| | | | | 718/1 |
| 2014/0283066 | A1* | 9/2014 | Teddy | G06F 21/51 |
| | | | | 726/23 |
| 2015/0178497 | A1* | 6/2015 | Lukacs | G06F 9/461 |
| | | | | 726/23 |
| 2015/0309811 | A1* | 10/2015 | Wisgo | H04W 4/00 |
| | | | | 719/331 |

* cited by examiner

MONITORING APPLICATION EXECUTION IN A CLONE OF A VIRTUAL COMPUTING INSTANCE FOR APPLICATION WHITELISTING

BACKGROUND

Organizations of all sizes struggle to protect their endpoints from a constant barrage of cyber attacks like malware. Traditional defense mechanisms like anti-malware solutions may employ a blacklisting strategy where every executable (also referred to herein as "application") is allowed execution privilege except for some well-known malicious executables. However, such blacklisting strategies are not effective as new forms of malware emerge frequently, thus making it hard for system administrators to identify and combat these threats before it is too late. In summary, blacklisting based approaches simply cannot keep pace with the sheer volume of malware that newly emerge.

An alternative approach known as whitelisting, where only well-known applications are given execution privileges, has been gaining momentum. The main challenge with adopting a whitelisting strategy is that as new applications emerge, many of their runtime behavior remain unknown. Before such unknown applications, which are referred to as "gray" applications, can be added to the whitelist, their runtime behavior needs to be first examined and classified as being safe by the system administrator. However, as the number of gray applications continue to increase with the rapid development of new applications, it is difficult for the system administrator to keep pace.

DETAILED DESCRIPTION

According to one or more embodiments, gray applications that are selected to be executed in a first virtual machine are executed and monitored in a second virtual machine that is a clone of the first virtual machine, and classified according to their monitored behavior. This process is conducted in real-time, in response to a notification that a gray application has been selected for execution in the first virtual machine. The execution of the gray application in the first virtual machine is delayed until the first virtual machine receives a notification from an application admission control manager that the gray application is safe to be executed in the first virtual machine. Although the execution of the gray application in the first virtual machine is delayed, all other processes running in the first virtual machine continue to their execution so that a user accessing the first virtual machine will not experience any downtime.

Figure 1:
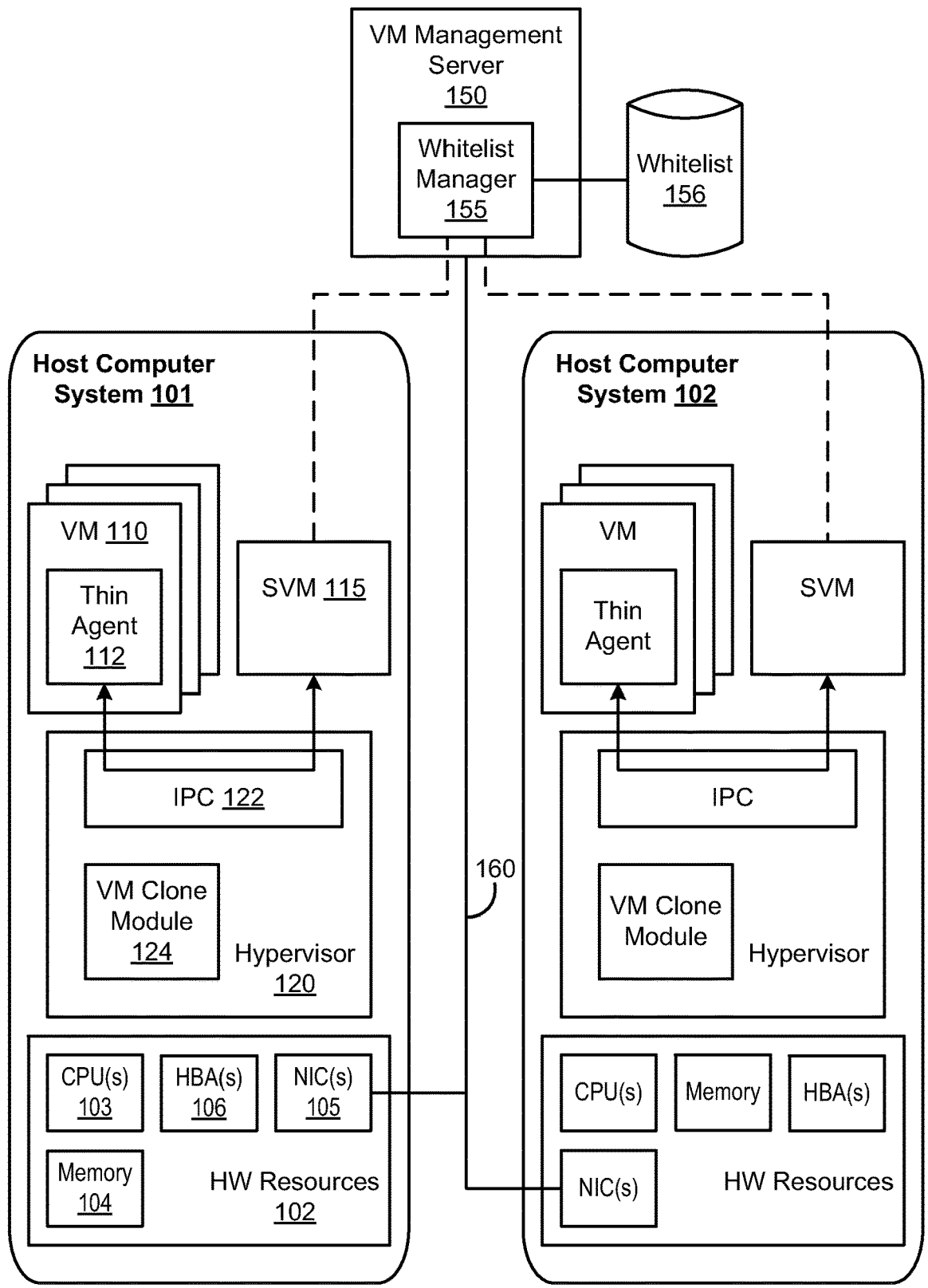
FIG. 1 is a block diagram of a virtualized computing environment in which one or more embodiments may be practiced.

FIG. 1 is a block diagram of a virtualized computing environment in which one or more embodiments may be practiced. In the virtualized computing environment shown in FIG. 1, two host computers systems 101, 102 are depicted, but it should be recognized that the number of host computers systems may be one or may be many. Also, in the description that follows, only the components of host computer system 101 will be described. Host computer system 102 are shown as configured identically to host computers system 101, but the two configurations need not be identical.

Host computer system 101 may be a desktop computer, laptop computer, tablet computer, mobile device such as a smartphone, server grade computer system, or any other suitable hardware computing platform, including systems based on different variations of the well-known ARM or x86 architecture platforms. Host computer system 101 is configured with hardware resources 102 that include one or more central processing units (CPUs) 103, system memory 104, one or more network interface controllers (NICs) 105, one or more host bus adapters (HBAs) 106, and other conventional computer hardware components (not shown), and a virtualization software layer, hypervisor 120, that manages hardware resources 102 and supports the concurrent execution of one or more virtual machines (VMs) 110 and a security virtual machine (SVM) 115 using hardware resources 102.

A VM management server 150 communicates with hypervisor 120 through a management channel 160 to instantiate virtual machines in the host computer systems that are under its control and management. In the embodiment illustrated herein, VM management server 150 is shown configured with a whitelist manager 155 that centrally performs application admission control for the host computer systems. Whitelist manager 155 maintains in persistent storage a whitelist 156 that contains hash signatures of all executables of applications that have been determined to be safe. VM management server 150 also manages cloning of VMs in the host computers systems through VM clone modules configured in the host computer systems in accordance with the VM forking technique described in U.S. patent application Ser. No. 14/136,661, the entire contents of which are incorporated by reference herein.

In FIG. 1, VMs 110 are instantiated for end users, and SVM 115 is instantiated as an agent for whitelist manager 155. When an application is selected to be run in one of VMs 110, the file event associated therewith is detected by a thin agent 112 of the corresponding VM. Thin agent 112 is implemented as a file system filter driver in the guest operating system of the VM, that intercepts file events and passes them to SVM 115 via an inter-process communication channel depicted in FIG. 1 as multiplexer 122. In addition, thin agent 112 pauses execution of that application until it receives some form of allow or deny action from SVM 115. In one embodiment, thin agent 112 communicates with multiplexer 122 over a communication interface known as VMCI (virtual machine communication interface, which implements a shared memory communication mechanism with a socket application interface), and SVM 115 communicates with multiplexer 122 over TCP/IP using a forwarding table. It should be recognized that other types of communication interfaces may be used in alternative embodiments.

Upon receipt of the file event from thin agent 112, SVM 115 generates a file signature from the executable of application to be launched, and transmits the file signature to whitelist manager 155, which then compares the file signature to those stored in whitelist 156. If there is a match, SVM 115 communicates an allow action to thin agent 112 of VM 110 through multiplexer 122.

Figure 2:
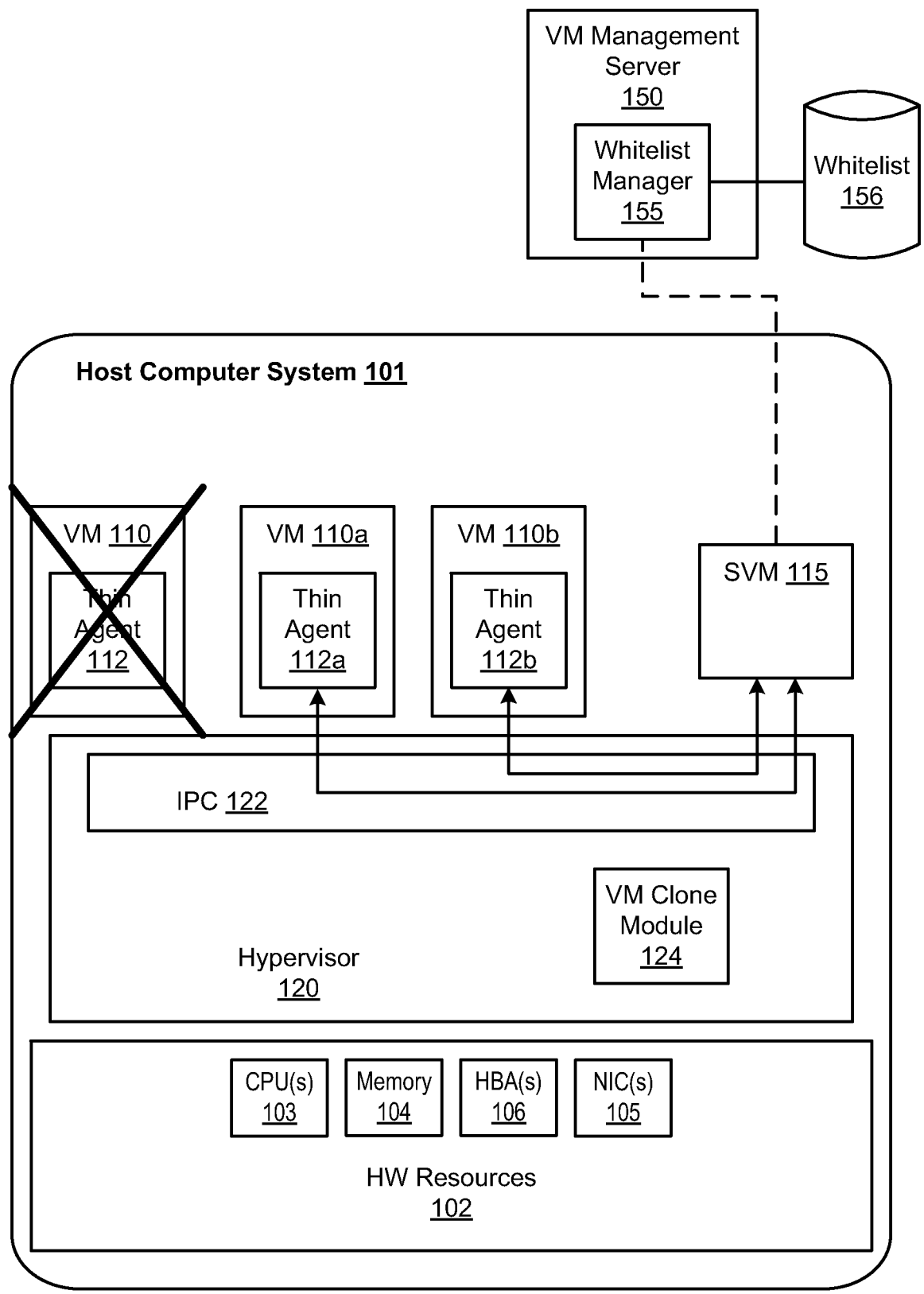
FIG. 2 illustrates one of host computer systems of FIG. 1 that is carrying out a process of classifying a gray application according to an embodiment.

If there is no match, the application is deemed to be a gray application, and instead of immediately communicating a deny action to thin agent 112 of VM 110 through multiplexer 122, VM management server 150 transmits a command to VM clone module 124 to clone VM 110 into two VM clones, VM 110a and VM 110b, as shown in FIG. 2. As a result of this process, the original VM, VM 110, is quiesced, and the first VM clone, VM 110a, referred to herein as the safe VM, maintains all existing TCP/UDP sessions and replaces VM 110 as the live VM, thus also having the execution of the gray application paused therein. Then, SVM 115 communicates with the second VM clone, VM 110b, referred to herein as the test VM, to launch and execute the gray application therein.

As the gray application executes in the test VM, new file events are generated and captured by thin agent 112b, which transmits them to SVM 115 through multiplexer 122. Upon receipt of the new file events, SVM 115 transmits them to whitelist manager 155 for evaluation. In one embodiment, whitelist manager 155 consults a policy database to determine if any of the new file events violates one or more security policies and generates a composite score therefrom. If the composite score is below a threshold (which could be adjusted up or down depending on the security level selected by the system administrator), whitelist manager 155 returns a deny action to SVM 115, which communicates the deny action to thin agent 112a through multiplexer 122. Upon receiving the deny action, thin agent 112a causes the paused execution inside the safe VM to exit the waiting state and generates an error message indicating that the application selected for launching violates a security policy. On the other hand, if the composite score is at or above the threshold, whitelist manager 155 adds the file signature of the gray application to whitelist 156 and returns an allow action to SVM 115, which communicates the allow action to thin agent 112a through multiplexer 122. Upon receiving the allow action, thin agent 112a causes the paused execution inside the safe VM to resume.

In the embodiment described above, thin agents 112a, 112b are configured to intercept file events. In alternative embodiments, thin agents 112a, 112b may be configured to intercept not only file events but other types of events such as network events and system events that could help with the profiling of an application. In addition, in alternative embodiments, a different VM cloning technique may be used to generate only a single VM clone. In such embodiments, the original VM would be used as the safe VM and the VM clone would be used as the test VM.

Figure 3A:
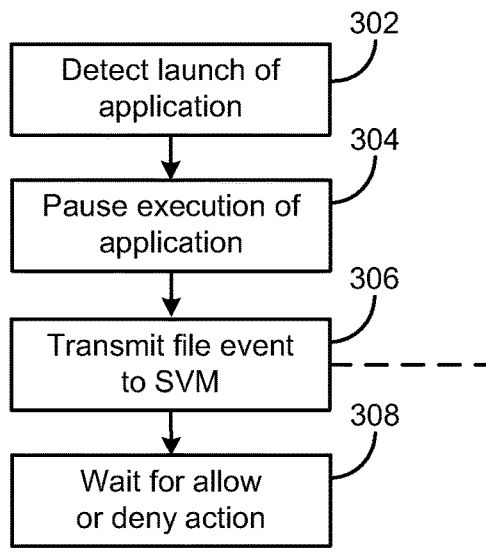
FIGS. 3A and 3B are flow diagrams of method steps carried out by a virtual machine during the process of classifying a gray application according to the embodiment.
Figure 3B:
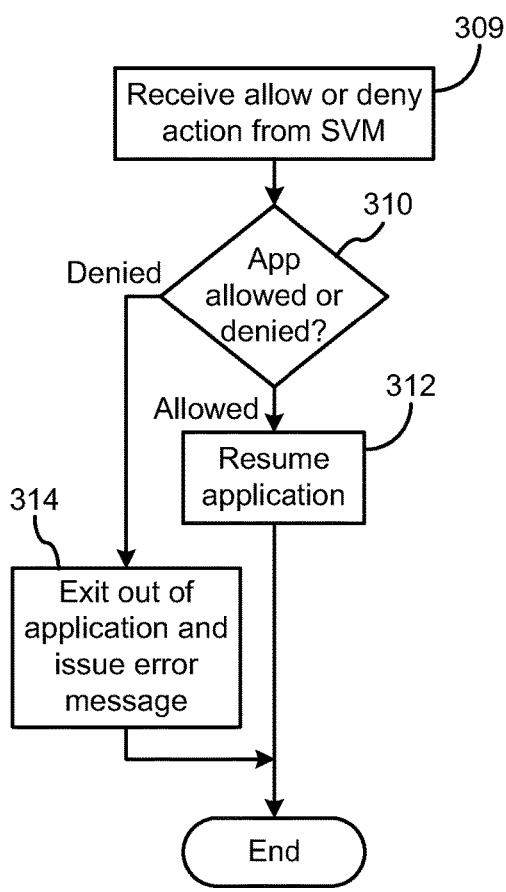
Figure 4:
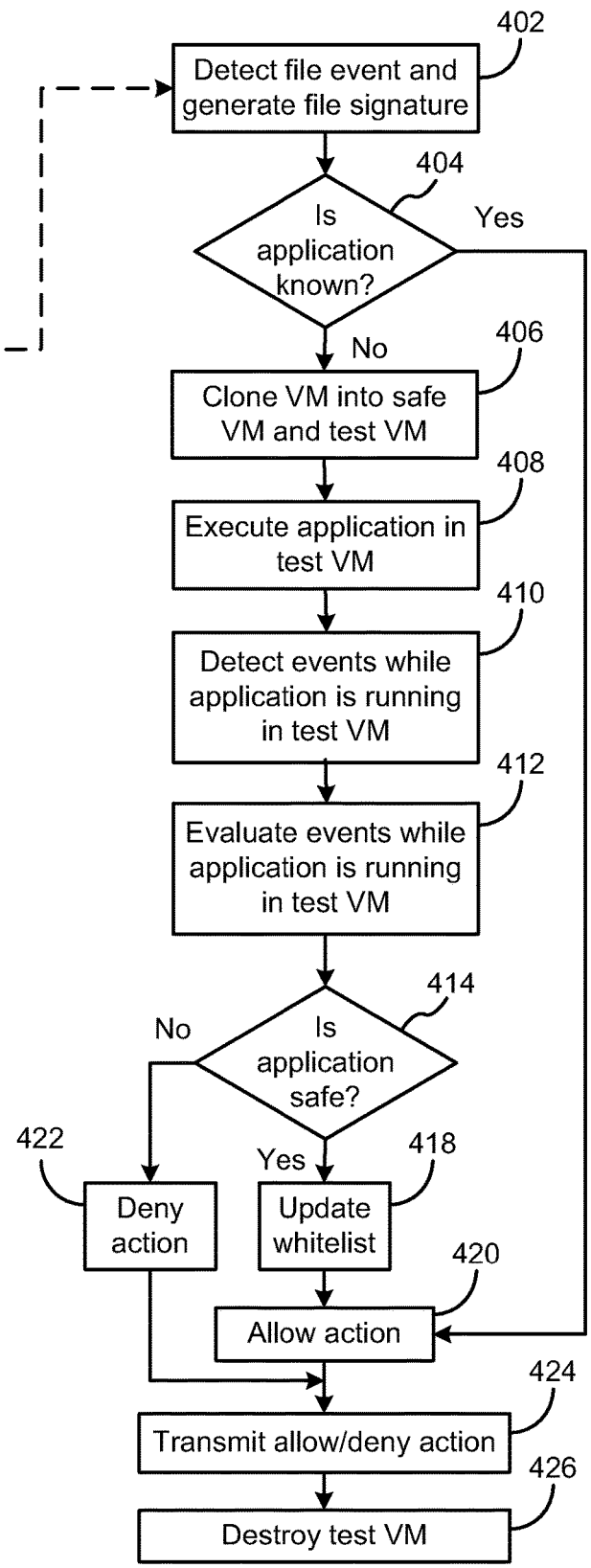
FIG. 4 is a flow diagram of method steps carried out by an application admission control manager during the process of classifying a gray application according to the embodiment.

FIGS. 3A and 3B are flow diagrams of method steps carried out by a virtual machine, in particular the thin agent, during the process of classifying a gray application according to the embodiment. FIG. 4 is a flow diagram of method steps carried out by a secure virtual machine and a VM management server that includes a whitelist manager during the process of classifying a gray application according to the embodiment. Although it should be recognized that other comparable systems may implement the process of classifying a gray application according to the embodiment, the steps described herein are implemented in the system depicted in FIGS. 1 and 2 and described above.

The method begins at step 302, when thin agent 112 detects a file event associated with launching of an application. Thin agent 112 pauses execution of this application at step 304 and transmits the file event to SVM 115 through multiplexer 122 at step 306. Thin agent 112 then waits for an allow or deny action before proceeding further with the application launch.

At step 402, SVM 115 detects the file event as a result of the notification from thin agent 112 and generates a file signature of the application. At step 404, whitelist manager 155 compares the file signature to those stored in whitelist 156. If there is a match, whitelist manager 155 at step 420 generates an allow action and SVM 115 at step 422 communicates the allow action to thin agent 112 of VM 110 through multiplexer 122.

Referring now to the method steps of FIG. 3B, which are executed in VM 110, when thin agent 112 receives the allow action at step 309, it executes the decision block at step 310 and then step 312 where the thin agent 112 causes the paused execution inside the VM to resume.

If whitelist manager 155 determines at step 404 that there is no match, VM management server 150 at step 406 transmits a command to VM clone module 124 to clone VM 110 into two VM clones, the safe VM (VM 110a) and the test VM (VM 110b). Then, at step 408, SVM 115 communicates with thin agent 112b of the test VM to execute the application inside the test VM. As the application executes in the test VM, new file events are generated and captured by thin agent 112b, which transmits them to SVM 115 through multiplexer 122. SVM 115 at step 410 detects these new file events and transmits them to whitelist manager 155 and whitelist manager 155 evaluates them at step 412. In one embodiment, whitelist manager 155 consults a policy database to determine if any of the new file events violates one or more security policies and generates a composite score therefrom. At the decision block 414, whitelist manger 155 determines if the application is safe, i.e., the composite score is at or above a threshold (which could be adjusted up or down depending on the security level selected by the system administrator). If the application is deemed to be safe, whitelist manager 155 adds the file signature of the application to whitelist 156 at step 418 and returns an allow action to SVM 115 at step 420, which communicates the allow action to thin agent 112a through multiplexer 122 at step 424. On the other hand, if the composite score is below the threshold, whitelist manager 155 returns a deny action to SVM 115 at step 422, which communicates the deny action to thin agent 112a through multiplexer 122 at step 424. After step 424, step 426 is executed where VM management server 150 transmits a command to VM clone module 124 to destroy the test VM.

Referring now to the method steps of FIG. 3B, which are executed in VM 110a because the execution state of VM 110 at this point has been completely transferred to the safe VM, upon receiving the allow or deny action at step 309, thin agent 112a executes the decision block at step 310. If the allow action is received, thin agent 112a at step 312 causes the paused execution inside the safe VM to resume execution. If the deny action is received, thin agent 112a at step 314 causes the paused execution inside the safe VM to exit the waiting state and generates an error message indicating that the application selected for launching violates a security policy.

In the embodiment described above, whitelist manager 155 performs application admission control by comparing file events generated by the gray application running inside a test VM against a policy database. The techniques described herein, however, are flexible to accommodate other types of security monitoring in place of or in addition to comparing file events against a policy database. For example, upon completion of the execution of the gray application, a malware scan of the entire test VM could be carried out.

In addition, instead of performing application admission control based on a composite score, whitelist manager 155 may monitor the events for particular types of attacks and issue a deny action when these attacks are detected. For example, the attacks that automatically trigger a deny action include a change to a system registry file or an opening of a port to an unknown location.

It should also be recognized that some of the functions described above as being performed by SVM 115 may be pushed out to whitelist manger 155 and performed by whitelist manger 155. Similarly, some or all of the functions described above as being performed by whitelist manger 155 may be performed locally by SVM 115.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of performing admission control of an application that has been selected for execution in a first virtual computing instance on a host machine, comprising:
    detecting, by an agent running in the first virtual computing instance, a file event associated with launching of the application;
    based on the detecting, sending a notification of the file event to a third virtual computing instance on the host machine;
    based on the notification of the file event, determining whether or not the application has previously been approved for execution;
    based on determining that the application has not previously been approved for execution, creating a second virtual computing instance on the host machine that is a clone of the first virtual computing instance;
    executing the application in the second virtual computing instance;
    during execution of the application in the second virtual computing instance, capturing, by a second agent running in the second virtual computing instance, new file events generated within the second virtual computing instance and transmitting, by the second agent, the new file events to the third virtual computing instance;
    determining from the new file events whether or not the application is to be approved for execution in the first virtual computing instance;
    if the application is approved for execution in the first virtual computing instance, executing the application in the first virtual computing instance; and
    if the application is not approved for execution in the first virtual computing instance, transmitting an error message to the first virtual computing instance and not executing the application in the first virtual computing instance.

2. The method of claim 1, wherein the first and second virtual computing instances are each a virtual machine.

3. The method of claim 1, wherein the first and second virtual computing instances are each a container that does not include a guest operating system.

4. The method of claim 1, wherein the first virtual computing instance continues to run while the application is executed in the second virtual computing instance.

5. The method of claim 1, wherein the new file events are examined for compliance with security policies.

6. The method of claim 5, wherein the application is not approved for execution in the first virtual computing instance if, during execution of the application in second virtual computing instance, a change to a system registry file is detected or an opening of a port to an unknown location is detected.

7. The method of claim 1, further comprising:
    after executing the application in the second virtual computing instance, performing a malware scan on the second virtual computing instance; and
    determining from results of the malware scan whether or not the application is to be approved for execution in the first virtual computing instance, wherein the application is not approved for execution in the first virtual computing instance if malware is discovered as a result of the malware scan.

8. A non-transitory computer-readable storage medium comprising instructions executable in a computer system to cause the computer system to carryout a method of performing admission control of an application that has been selected for execution in a first virtual computing instance on a host machine, the method comprising the steps of:
    detecting, by an agent running in the first virtual computing instance, a file event associated with launching of the application;
    based on the detecting, sending a notification of the file event to a third virtual computing instance on the host machine;
    based on the notification of the file event, determining whether or not the application has previously been approved for execution;
    based on determining that the application has not previously been approved for execution, creating a second virtual computing instance on the host machine that is a clone of the first virtual computing instance;
    executing the application in the second virtual computing instance;
    during execution of the application in the second virtual computing instance, capturing, by a second agent running in the second virtual computing instance, new file events generated within the second virtual computing instance and transmitting, by the second agent, the new file events to the third virtual computing instance;
    determining from the new file events whether or not the application is to be approved for execution in the first virtual computing instance;
    if the application is approved for execution in the first virtual computing instance, executing the application in the first virtual computing instance; and
    if the application is not approved for execution in the first virtual computing instance, transmitting an error message to the first virtual computing instance and not executing the application in the first virtual computing instance.

9. The non-transitory computer-readable storage medium of claim 8, wherein the first and second virtual computing instances are each a virtual machine.

10. The non-transitory computer-readable storage medium of claim 8, wherein the first and second virtual computing instances are each a container that does not include a guest operating system.

11. The non-transitory computer-readable storage medium of claim 8, wherein the first virtual computing instance continues to run while the application is executed in the second virtual computing instance.

12. The non-transitory computer-readable storage medium of claim 8, wherein the new file events are examined for compliance with security policies.

13. The non-transitory computer-readable storage medium of claim 12, wherein the application is not approved for execution in the first virtual computing instance if, during execution of the application in the second virtual computing instance, a change to a system registry file is detected or an opening of a port to an unknown location is detected.

14. The non-transitory computer-readable storage medium of claim 8, wherein the method further comprises the steps of:

after executing the application in the second virtual computing instance, performing a malware scan on the second virtual computing instance; and determining from results of the malware scan whether or not the application is to be approved for execution in the first virtual computing instance, wherein the application is not approved for execution in the first virtual computing instance if malware is discovered as a result of the malware scan.

15. A computer system comprising hardware resources including at least one processor and system memory that are configured with virtualization software to support running of a first virtual computing instance on a host machine, the at least one processor being configure to:

detect, by an agent running in the first virtual computing instance, a file event associated with launching of an application;

based on the detecting, sending a notification of the file event to a third virtual computing instance on the host machine;

based on the notification of the file event, determining whether or not the application has previously been approved for execution;

based on determining that the application has not previously been approved for execution, create a second virtual computing instance on the host machine that is a clone of the first virtual computing instance;

execute the application in the second virtual computing instance;

during execution of the application in the second virtual computing instance, capture, by a second agent running in the second virtual computing instance, new file events generated within the second virtual computing instance and transmit, by the second agent, the new file events to the third virtual computing instance;

determine from the new file events whether or not the application is to be approved for execution in the first virtual computing instance;

if the application is approved for execution in the first virtual computing instance, execute the application in the first virtual computing instance; and if the application is not approved for execution in the first virtual computing instance, transmit an error message to the first virtual computing instance and not execute the application in the first virtual computing instance.

16. The computer system of claim 15, wherein the virtualization software includes an inter-process communication module by which anew events generated in the second virtual computing instance during execution of the application in the second virtual computing instance are transmitted to the third virtual computing instance.

17. The computer system of claim 15, wherein the first and second virtual computing instances are each a virtual machine.

18. The computer system of claim 15, wherein the first and second virtual computing instances are each a container that does not include a guest operating system.

* * * * *

UNITED STATES PATENT AND TRADEMARK OFFICE
CERTIFICATE OF CORRECTION

PATENT NO. : 10,726,119 B2
APPLICATION NO. : 14/564062
DATED : July 28, 2020
INVENTOR(S) : Feroz et al.

Page 1 of 1

It is certified that error appears in the above-identified patent and that said Letters Patent is hereby corrected as shown below:

In the Claims

Column 10, Line 19: delete "anew", insert --the new file--

Signed and Sealed this
Thirteenth Day of October, 2020

Andrei Iancu
*Director of the United States Patent and Trademark Office*